United States Patent
Pfadler et al.

(10) Patent No.: US 11,984,950 B2
(45) Date of Patent: May 14, 2024

(54) VEHICLE, APPARATUS, METHOD, AND COMPUTER PROGRAM FOR A VEHICLE IN A MOBILE COMMUNICATION SYSTEM

(71) Applicant: VOLKSWAGEN AKTIENGESELLSCHAFT, Wolfsburg (DE)

(72) Inventors: Andreas Pfadler, Berlin (DE); Steffen Schmitz, Wesel (DE); Andreas Kwoczek, Lehre (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 307 days.

(21) Appl. No.: 17/434,778

(22) PCT Filed: Feb. 27, 2020

(86) PCT No.: PCT/EP2020/055112
§ 371 (c)(1),
(2) Date: Aug. 30, 2021

(87) PCT Pub. No.: WO2020/178124
PCT Pub. Date: Sep. 10, 2020

(65) Prior Publication Data
US 2022/0140873 A1 May 5, 2022

(30) Foreign Application Priority Data
Mar. 7, 2019 (EP) .................... 19161441

(51) Int. Cl.
*H04B 7/06* (2006.01)
*H04B 17/318* (2015.01)
(Continued)

(52) U.S. Cl.
CPC ......... *H04B 7/0608* (2013.01); *H04B 7/0617* (2013.01); *H04B 17/318* (2015.01);
(Continued)

(58) Field of Classification Search
CPC ..... H04W 8/005; H04W 52/42; H04W 4/027; H04W 4/40; H04W 84/18; H04W 4/029;
(Continued)

(56) References Cited

U.S. PATENT DOCUMENTS 10,098,014 B1 10/2018 Shimizu et al.
10,925,071 B2 2/2021 Hehn et al.
(Continued)

FOREIGN PATENT DOCUMENTS

CN 105814809 A 7/2016
CN 108337662 A 7/2018
(Continued)

OTHER PUBLICATIONS

Shepard et al.; Control Channel Design for Many-Antenna MU-MIMO; MobiCom '15; Sep. 7-11, 2015; Paris France.
(Continued)

*Primary Examiner* — Vinncelas Louis
(74) *Attorney, Agent, or Firm* — Barnes & Thornburg LLP

(57) ABSTRACT

A transportation vehicle, an apparatus, a method, and a computer program for a transportation vehicle in a mobile communication system. The method for a first transportation vehicle in a mobile communication system for controlling a radio link to a second transportation vehicle includes setting up a radio link to the second transportation vehicle, determining information related to relative movement between an antenna of the first transportation vehicle and an antenna of the second transportation vehicle based on sensor data of the first transportation vehicle, and adjusting a beam pattern of the antenna of the first transportation vehicle based on the information related to relative movement to control the radio link.

26 Claims, 4 Drawing Sheets

(51) Int. Cl.
*H04B 17/391* (2015.01)
*H04W 4/02* (2018.01)
*H04W 4/46* (2018.01)
*H04W 4/40* (2018.01)
*H04W 84/18* (2009.01)

(52) U.S. Cl.
CPC ........ *H04B 17/3913* (2015.01); *H04W 4/027* (2013.01); *H04W 4/46* (2018.02); *H04W 4/40* (2018.02); *H04W 84/18* (2013.01)

(58) Field of Classification Search
CPC ........... H04W 4/06; H04W 4/38; H04W 4/70; H04W 4/46; H02J 3/322; H04B 7/084; H04B 7/0408; H04B 7/0608; H04B 7/0617; H04B 17/318; H04B 17/3913
See application file for complete search history.

(56) References Cited

U.S. PATENT DOCUMENTS

| | | | | |
|---|---|---|---|---|
| 2006/0211439 A1* | 9/2006 | Mizuguchi | ............ | H04W 52/42 455/63.4 |
| 2014/0210635 A1* | 7/2014 | Majava | .................. | H04B 7/084 342/377 |
| 2016/0381571 A1 | 12/2016 | Koravadi et al. | | |
| 2018/0199349 A1* | 7/2018 | Hehn | .................... | H04W 8/005 |
| 2020/0231059 A1* | 7/2020 | Hishida | .................. | H02J 3/322 |

FOREIGN PATENT DOCUMENTS

| | | | | |
|---|---|---|---|---|
| EP | 3089513 A1 | 11/2016 | | |
| EP | 3349372 A1 | 7/2018 | | |
| WO | WO-2015090353 A1 * | 6/2015 | ........... | H04B 7/0408 |
| WO | 2015171248 A1 | 11/2015 | | |

OTHER PUBLICATIONS

Search Report for European Patent Application No. 19161441.1; Oct. 11, 2019.
Search Report for International Patent Application No. PCT/EP2020/055112; Apr. 14, 2020.
Office Action; Chinese Patent Application No. 202080019343.6; Dec. 21, 2023.

* cited by examiner

VEHICLE, APPARATUS, METHOD, AND COMPUTER PROGRAM FOR A VEHICLE IN A MOBILE COMMUNICATION SYSTEM

PRIORITY CLAIM

This patent application is a U.S. National Phase of International Patent Application No. PCT/EP2020/055112, filed 27 Feb. 2020, which claims priority to European Patent Application No. 19161441.1, filed 7 Mar. 2019, the disclosures of which are incorporated herein by reference in their entireties.

SUMMARY

Illustrative embodiments relate to a transportation vehicle, an apparatus, a method, and a computer program for a transportation vehicle in a mobile communication system, more particularly, but not exclusively, to a concept for controlling a radio link through beam pattern adjustments between transportation vehicles.

BRIEF DESCRIPTION OF THE DRAWINGS

Disclosed embodiments will be described with reference to the accompanying figures, in which.

DETAILED DESCRIPTION

Figure 1:
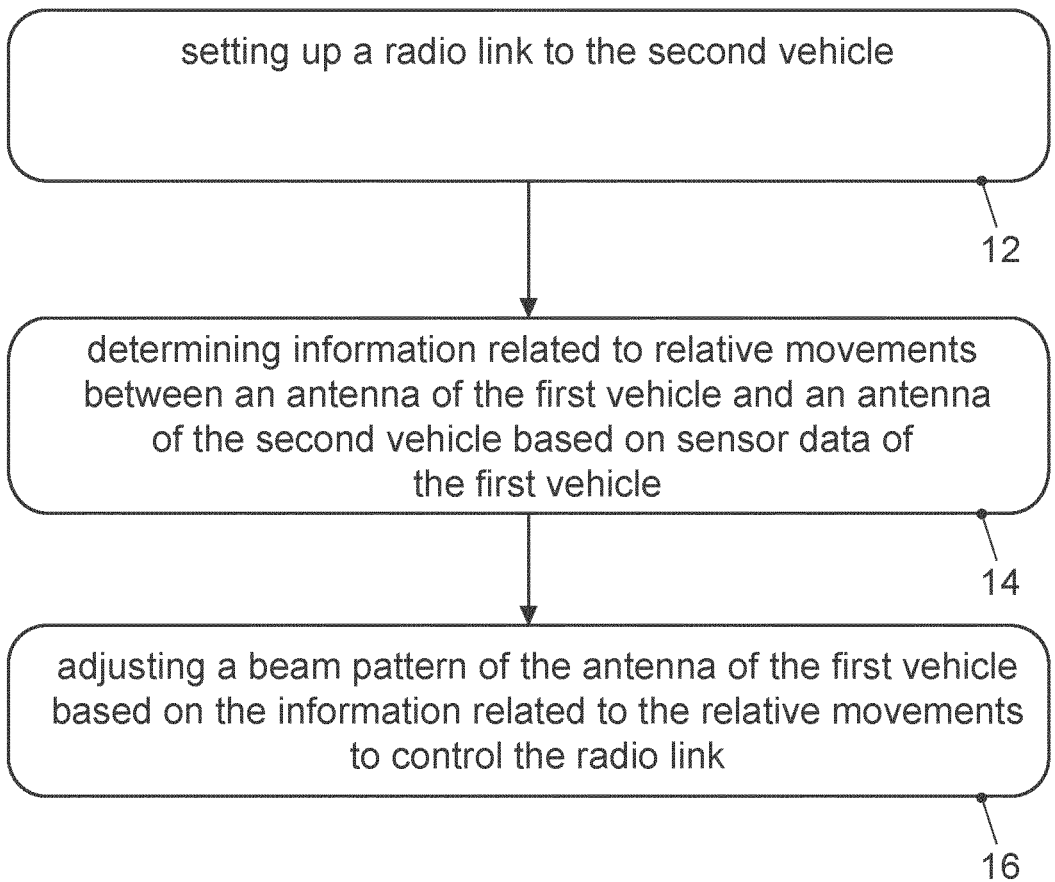
FIG. 1 illustrates a block diagram of an exemplary embodiment of a method for a transportation vehicle.

WO 2015/171248 A1 discloses a concept for establishing a communication link between user equipment and a connection point using low-frequency and high-frequency channels. The low frequency channel is used to provide information based on which a high-frequency channel can be received. Clayton Shepard et al, "Control Channel Design for Many-Antenna MU-MIMO", Rice University 2015, disclose a control channel design for a multi-user beamforming scenario. Document EP 3 089 513 A1 describes a concept in which based on a mobility of a mobile transceiver a radio channel condition is predicted. The future radio channel condition serves as a basis for planning future assignments to base station transceivers.

Conventional concepts consider the coexistence of multiple access technologies or access frequencies. Infrastructure of mobile communication systems can be used to communicate information on the availability of other radio access technologies or access frequencies.

There is a demand for an improved concept for controlling direct communication between transportation vehicles.

Disclosed embodiments are based on the finding that direct communication between transportation vehicles at higher frequencies may require antenna adaption on both sides of the communication, at the transmitter and at the receiver. In transportation vehicles further information is available or can be made available based on which relative movement between antennas of different transportation vehicles can be determined. Once information related to the relative movement between the antennas is available beam pattern adjustments at the antennas can be carried out and a radio link between the transportation vehicles can be controlled or maintained. For example, movement related to driving maneuvers can be detected in a transportation vehicle and antenna beam pattern can be adjusted to compensate for the movement.

Disclosed embodiments provide a method for a first transportation vehicle in a mobile communication system for controlling a radio link to a second transportation vehicle. The method comprises setting up a radio link to the second transportation vehicle and determining information related to relative movement between an antenna of the first transportation vehicle and an antenna of the second transportation vehicle based on sensor data of the first transportation vehicle. The method further comprises adjusting a beam pattern of the antenna of the first transportation vehicle based on the information related to relative movement to control the radio link. Disclosed embodiments may enable inter-vehicle radio communications at higher frequencies since beam patterns on both sides of the radio link may be oriented towards each other such that higher pathlosses may be overcome by enabling higher antenna gains. The radio link may be kept more robust.

For example, the sensor data may comprise one or more elements of the group of radar, light detection and ranging, optical, camera, ultrasonic, time of flight, and acceleration data. The transportation vehicle may have a plurality of sensors, e.g., radar, lidar (light detection and ranging), optical, cameras, ultrasonic, time of flight, inertial, etc. This data may be used to monitor a location and position/orientation of the first transportation vehicle and potentially also location and position of the second transportation vehicle. Based on this information a relative location and position between the two transportation vehicles (their antennas) can also be determined, estimated, or predicted and the antenna pattern can be adjusted accordingly.

In some exemplary embodiments the determining may be further based on data received from the second transportation vehicle. For example, the second transportation vehicle may provide information related to its momentary or future location and position, its antenna, respectively. Based on this the relative position, location, or movement may be determined and the beam pattern may be adjusted accordingly.

The information related to relative movement may relate to future movement. Disclosed embodiments may use prediction to anticipate future amendments of the beam pattern. Such prediction may further improve the radio link quality.

The determining may be further based on information related to a driving maneuver, a road profile, a route, or map data of the first and/or second transportation vehicles. Information on the environment can be used in some exemplary embodiments to predict or anticipate movement of changes in the relative location of the antennas of the two transportation vehicles to each other. Moreover, if instabilities can be predicted the beam pattern can be adapted to counteract these instabilities, e.g., when one of the transportation vehicles faces corrugations in the road surface or other road surface irregularities.

The adjusting of the beam pattern may comprise adjusting a direction of a main lobe of the beam pattern. Disclosed embodiments may compensate if the angle of the antenna of the two transportation vehicles changes. Furthermore, the adjusting of the beam pattern may comprise adjusting a maximum gain and/or a width of a main lobe of the beam pattern. Hence, if the angular variations are foreseen in the radio channel (curvy road, road surface irregularities) the beam gain may be lowered, and the beam width may be widened. This may lead to a higher robustness in such a situation at the cost of a decreased signal quality, higher transmission power, respectively. In some exemplary embodiments the adjusting of the beam pattern may comprise adjusting a shape of the beam pattern. In this case further interferers may be suppressed by directing spatial nulls of the beam pattern in the direction of the interferers.

For example, the radio link uses a radio frequency above 6 GHz. In exemplary embodiments mmWave-bands are conceivable for direct vehicle-to-vehicle communication using line-of-sight radio wave propagation.

In some further exemplary embodiments the determining may be further based on information received within the mobile communication system. The network may have an overview on a traffic situation, interference conditions, network load etc. Such information may be further considered in exemplary embodiments for beam pattern adjustments.

The method may further comprise transmitting information related to a future position of the first transportation vehicle or the antenna of the first transportation vehicle to the second transportation vehicle or within mobile communication system. This information may then be made available in the second transportation vehicle an mutual beam pattern adjustments may further contribute to the quality of the radio link.

Exchanging control information to control mutual antenna configurations with the second transportation vehicle may be comprised in the method in some further exemplary embodiments. Such control information may enable a closed loop beam adjustment mechanism adjusting the beam pattern in a continuous and stable way.

Disclosed embodiments further provide an apparatus for a transportation vehicle in a mobile communication system. The apparatus comprises one or more interfaces, which are configured to communicate in the mobile communication system. The apparatus further comprises a control module configured to control the one or more interfaces. The control module is further configured to perform one of the methods described herein. A further exemplary embodiment is a transportation vehicle comprising the apparatus.

Disclosed embodiments further provide a computer program having a program code for performing one or more of the above described methods, when the computer program is executed on a computer, processor, or programmable hardware component. A further exemplary embodiment is a computer readable storage medium storing instructions which, when executed by a computer, processor, or programmable hardware component, cause the computer to implement one of the methods described herein.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

As used herein, the term "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted similarly.

The terminology used herein is for the purpose of describing disclosed embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" or "including", when used herein, specify the presence of stated features, integers, operations, elements or components, but do not preclude the presence or addition of one or more other features, integers, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

FIG. 1 shows a block diagram of an exemplary embodiment of a method 10 for a first transportation vehicle in a mobile communication system for controlling a radio link to a second transportation vehicle. The method comprises setting up 12 a radio link to the second transportation vehicle and determining 14 information related to relative movement between an antenna of the first transportation vehicle and an antenna of the second transportation vehicle based on sensor data of the first transportation vehicle. The method further comprises adjusting 16 a beam pattern of the antenna of the first transportation vehicle based on the information related to relative movement to control the radio link.

Figure 2:
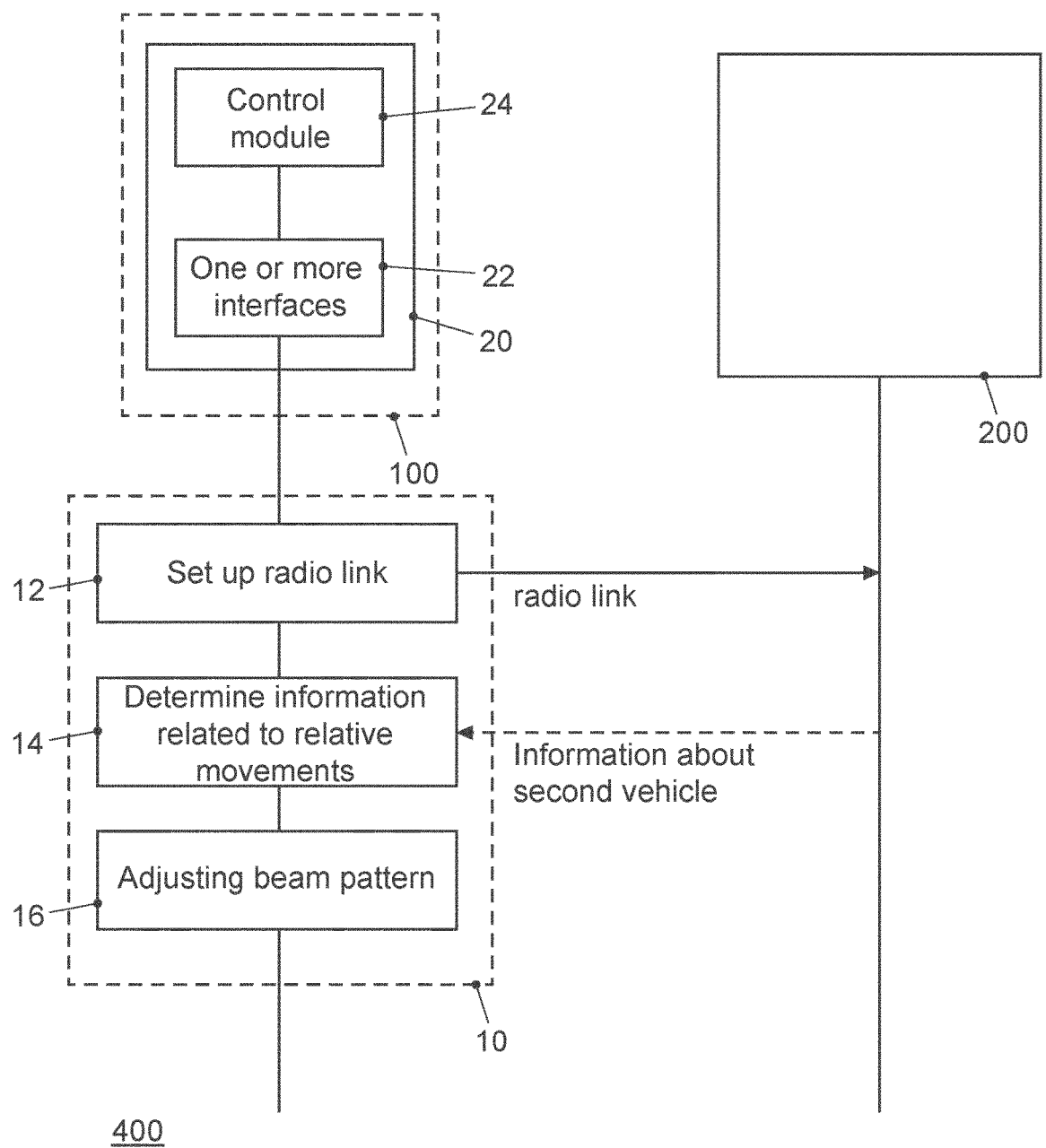
FIG. 2 illustrates a block diagram of an exemplary embodiment of an apparatus and exemplary embodiments of transportation vehicles.

FIG. 2 illustrates block diagrams of an exemplary embodiment of an apparatus 20 and exemplary embodiments of transportation vehicles 100, 200. The apparatus 20 for the first transportation vehicle 100 comprises one or more interfaces 22 configured to communicate in the mobile communication system 400. The apparatus 20 further comprises a control module 24, which is coupled to the one or more interfaces 22 and which is configured to control the one or more interfaces 22. The control module 24 is further configured to perform one of the methods 10 as described herein. FIG. 2 further illustrates an exemplary embodiment of a second transportation vehicle, which also comprises an exemplary embodiment of the apparatus 20. As will be described in the following, transportation vehicle 100 may carry out the method 10. FIG. 2 further illustrates an exemplary embodiment of a mobile communication system 400.

In exemplary embodiments the one or more interfaces 22 may correspond to any method or mechanism for obtaining, receiving, transmitting or providing analog or digital signals or information, e.g., any connector, contact, pin, register, input port, output port, conductor, lane, etc. which allows providing or obtaining a signal or information. An interface may be wireless or wireline and it may be configured to communicate, i.e., transmit or receive signals, information with further internal or external components. The one or more interfaces 22 may comprise further components to enable according communication in the mobile communication system 400, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The one or more interfaces 22 may be coupled to one or more antennas, which may correspond to any transmit and/or receive antennas, such as horn antennas, dipole antennas, patch antennas, sector antennas etc. The antennas may be arranged in a defined geometrical setting, such as a uniform array, a linear array, a circular array, a triangular array, a uniform field antenna, a field array, combinations thereof, etc. In some examples the one or more interfaces 22 may serve the purpose of transmitting or receiving or both, transmitting and receiving, information, such as information related to capabilities, application requirements, trigger indications, requests, messages, data packets, acknowledgement packets/messages, etc.

As shown in FIG. 2 the one or more interfaces 22 are coupled to the control module 24 at the apparatus 20. In exemplary embodiments the control module 24 may be implemented using one or more processing units, one or more processing devices, any method or mechanism for processing, such as a processor, a computer or a programmable hardware component being operable with accordingly adapted software. In other words, the described functions of the control modules 24 may as well be implemented in software, which is then executed on one or more programmable hardware components. Such hardware components may comprise a general purpose processor, a Digital Signal Processor (DSP), a micro-controller, etc.

FIG. 2 also shows an exemplary embodiment of a system 400 comprising exemplary embodiments of the transportation vehicles 100, 200. In exemplary embodiments, communication, i.e., transmission, reception or both, may take place among transportation vehicles 100, 200 directly and/or between mobile transceivers/vehicles 100, 200 and a network component (infrastructure or mobile transceiver, e.g., a base station, a network server, a backend server, etc.). Such communication may make use of a mobile communication system 400. Such communication may be carried out directly, e.g., by device-to-device (D2D) communication, which may also comprise vehicle-to-vehicle (V2V) or car-to-car communication in case of transportation vehicles 100, 200. Such communication may be carried out using the specifications of a mobile communication system 400.

In exemplary embodiments the one or more interfaces 22 can be configured to wirelessly communicate in the mobile communication system 400. To do so radio resources are used, e.g., frequency, time, code, and/or spatial resources, which may be used for wireless communication with a base station transceiver as well as for direct communication. The assignment of the radio resources may be controlled by a base station transceiver, i.e., the determination which resources are used for D2D and which are not. Here and in the following radio resources of the respective components may correspond to any radio resources conceivable on radio carriers and they may use the same or different granularities on the respective carriers. The radio resources may correspond to a Resource Block (RB as in LTE/LTE-A/LTE-unlicensed (LTE-U)), one or more carriers, sub-carriers, one or more radio frames, radio sub-frames, radio slots, one or more code sequences potentially with a respective spreading factor, one or more spatial resources, such as spatial sub-channels, spatial precoding vectors, any combination thereof, etc.

For example, in direct cellular vehicle-to-anything (C-V2X), where V2X includes at least V2V, V2-Infrastructure (V2I), etc., transmission according to 3GPP Release 14 onward can be managed by infrastructure (so-called mode 3) or run in a UE.

FIG. 2 also illustrates the method 10 for controlling a radio link between a first transportation vehicle 100 and a second transportation vehicle 200. Transportation vehicle 100 sets up a radio link with the second transportation vehicle 200. For example, the setup-procedure may follow a standard procedure according to the specification of the mobile communication system 400. Transportation vehicle 100 then determines 16 information related to relative movement between an antenna of the first transportation vehicle 100 and an antenna of the second transportation vehicle 200 based on sensor data of the first transportation vehicle 100. As indicated by the broken line arrow, in some exemplary embodiments this may be aided by additional information provided by the second transportation vehicle 200. Transportation vehicle 100 then adjusts 16 a beam pattern of the antenna of the first transportation vehicle 100 based on the information related to relative movement to control the radio link.

The mobile communication system 400, as shown in FIG. 2, may, for example, correspond to one of the Third Generation Partnership Project (3GPP)-standardized mobile communication networks, where the term mobile communication system is used synonymously to mobile communication network. The mobile or wireless communication system 400 may correspond to a mobile communication system of the 5th Generation (5G, or New Radio (NR)) and may use mm-Wave technology. The mobile communication system may correspond to or comprise, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

Service provision may be carried out by a network component, such as a base station transceiver, a relay station or a UE, e.g., coordinating service provision in a cluster or group of multiple UEs. A base station transceiver can be operable or configured to communicate with one or more active mobile transceivers/vehicles 100, 200 and a base station transceiver can be located in or adjacent to a coverage area of another base station transceiver, e.g., a macro cell base station transceiver or small cell base station transceiver. Hence, exemplary embodiments may provide a mobile communication system 400 comprising two or more mobile transceivers/vehicles 100, 200 and one or more base station transceivers, wherein the base station transceivers may establish macro cells or small cells, as, e.g., pico-, metro-, or femto cells. A mobile transceiver or UE may correspond to a smartphone, a cell phone, a laptop, a notebook, a personal computer, a Personal Digital Assistant (PDA), a Universal Serial Bus (USB)-stick, a car, a transportation vehicle etc. A mobile transceiver may also be referred to as User Equipment (UE) or mobile in line with the 3GPP terminology. A transportation vehicle may correspond to any conceivable method or mechanism for transportation, e.g., a car, a bike, a motorbike, a van, a truck, a bus, a ship, a boat, a plane, a train, a tram, etc.

A base station transceiver can be located in the fixed or stationary part of the network or system. A base station transceiver may be or correspond to a remote radio head, a transmission point, an access point, a macro cell, a small cell, a micro cell, a femto cell, a metro cell etc. A base station transceiver can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station transceiver may correspond to a NodeB, an eNodeB, a Base Transceiver Station (BTS), an access point, a remote radio head, a relay station, a transmission point etc., which may be further subdivided in a remote unit and a central unit.

A mobile transceiver/vehicle 100 can be associated with a base station transceiver or cell. The term cell refers to a coverage area of radio services provided by a base station transceiver, e.g., a NodeB (NB), an eNodeB (eNB), a remote radio head, a transmission point, etc. A base station transceiver may operate one or more cells on one or more frequency layers, in some exemplary embodiments a cell may correspond to a sector. For example, sectors can be achieved using sector antennas, which provide a characteristic for covering an angular section around a remote unit or base station transceiver. In some exemplary embodiments, a base station transceiver may, for example, operate three or six cells covering sectors of 120° (in case of three cells), 60° (in case of six cells) respectively. A base station transceiver may operate multiple sectorized antennas. In the following a cell may represent an according base station transceiver generating the cell or, likewise, a base station transceiver may represent a cell the base station transceiver generates.

Transportation vehicles 100, 200 may communicate directly with each other, i.e., without involving any base station transceiver, which is also referred to as Device-to-Device (D2D) communication. An example of D2D is direct communication between transportation vehicles, also referred to as Vehicle-to-Vehicle communication (V2V), car-to-car, DSRC, respectively. Technologies enabling such D2D-communication include 802.11p, 3GPP system (4G, 5G, NR and beyond), etc.

In exemplary embodiments the determining 14 is based on sensor data of the first transportation vehicle 100. The sensor data may comprise one or more elements of the group of radar, light detection and ranging, optical, camera, ultrasonic, time of flight, and acceleration data. The transportation vehicle 100 may operate multiple sensor systems capturing data of the transportation vehicle's environment. Such data may comprise video data, imaging data, radar data, lidar data (light detection and ranging), temperature data, air pressure data, radio environment data, inertial sensor data, acceleration data, information received from other transportation vehicles, etc. This data may be used to determine information where the antenna of the second transportation vehicle 200 is located (relative to the antenna of the first transportation vehicle), e.g., by its position. In further exemplary embodiments this data may serve as a basis for determining an environmental model of the transportation vehicle 100. This model may be a digital representation of the environment of the transportation vehicle 100 possibly including other transportation vehicles, objects, roadside infrastructure, traffic signs, pedestrians, etc. The second transportation vehicle 200 may be part of the environmental model and hence directional information can be derived from the model to direct a beam pattern towards the antenna of the second transportation vehicle 200.

In some exemplary embodiments the second transportation vehicle 200 may provide information related to its antenna location or position to the first transportation vehicle 100. The determining 14 can then be further based on data received from the second transportation vehicle 200. For example, the shared information may be a cooperative awareness message (CAM). This message may be transmitted as part of car-to-car or vehicle-to-vehicle communication. For example, traffic and status information may be exchanged using this message. The message may use broadcast or multicast/groupcast communication. The message may carry information about the location and orientation of the second transportation vehicle together with type or model information, which allows concluding on the location and orientation of the antenna of the second transportation vehicle.

The information related to relative movement may relate to future movement. For example, the trajectories of the first and second transportation vehicles 100, 200 may be predicted and based thereon the future relative angles of their antennas. Again, such prediction can be based on sensor data of the first transportation vehicle in addition to route information. The second transportation vehicle may aid such prediction by accordingly provided information. The determining 14 can be is further based on information related to a driving maneuver, a road profile, a route, or map data of the first and/or second transportation vehicles 100, 200. Such data may serve as a basis to predict certain characteristics of the experienced radio channel between the transportation vehicles 100, 200. For example, if road bumps or surface irregularities are foreseen, the antenna or beam pattern can be accordingly adjusted or prepared.

For example, the transportation vehicles 100, 200 set up a communication/radio link at the second radio frequency, which is in a mmWave-band, e.g., at a frequency above 6 GHz such as 30-300 GHz, ITS bands (Intelligent Transportation Systems), 27-28 GHz, 3GPP FR1 and FR2 (Frequency Range), etc.

In this frequency range free space pathloss is critical (free space pathloss grows in a quadratic manner relative to frequency). At the same time antenna dimensions can be decreased with the decreasing wavelength and more antenna elements can be fit in a limited area. A higher number of antenna elements can be used for higher order beamforming to generate higher antenna/beamforming gains. For example, so called pencil beams can be generated, which are narrow antenna beams with high gain. Such beamforming can be achieved using antenna elements in a defined geometric pattern, where the signal phase of each individual antenna element signal is varied in a way, that for certain directions constructive and for other directions destructive superposition of the antenna element signals is achieved. The phase variations can be applied in the base band or in the transmission band, using analog or digital signal processing. In general, directional (high gain) antennas may be used in exemplary embodiments, where beamforming is one option to implement a high gain antenna, be it digital, analog, or both. Depending on the operating frequency a line-of-sight radio channel (direct propagation path between transmit and receive antennas) may be necessary to establish a communication/radio link. Respective antenna beams may then directly point to each other.

Optionally a gimbal may be used to install one or more directional antennas at the transportation vehicle 100, 200. The antenna may then be steered of pointed based on the information related to the relative movement the transportation vehicles 100, 200 using actuators to adjust the antenna in the gimbal.

It is noted that in some exemplary embodiments optimal beams might not be pencil beams and they might not point directly to each other. To provide an optimal quality on the communication/radio link, the receive power from a desired transmitter might not be the only criterion. Interference from others might be just as important. For example, a signal-to-interference-and-noise ratio may be an optimization criterion. In this case it might be more desirable to attenuate an interferer than to maximize a reception power from a desired transmitter. In such a scenario an interferer may even be spatially cancelled (also referred to as spatial nulling) by using destructive signal superposition for a direction of the interferer. The beam formed in such a scenario might not be a pencil beam (maximum antenna gain in one direction) but may be of an arbitrary shape, particularly, if multiple spatial nulls are used to suppress multiple interferers.

As has been mentioned above, exemplary embodiments may make use of beamforming, which is to be understood as signal processing method or mechanism to achieve defined or controlled superposition of the signals transmitted/received by the individual transmit/receive antenna elements. For example, a geometry of a plurality of transmit/receive antenna elements may correspond to a linear antenna array, a circular antenna array, a triangular antenna array, any two-dimensional antenna array or field, or even an arbitrary antenna array, for as long as geometrical relations between the antenna elements are known or controlled. In some exemplary embodiments, the plurality of antenna elements or transmit/receive antenna elements may correspond to a uniform linear antenna array, wherein the transmit/receive antennas are spaced uniformly, and the distance between to antenna elements may correspond to, for example, half of a wavelength of the carrier frequency of the signals transmitted/received using these antenna elements. As known for beamforming, by providing phase shifted versions of the same signal to different antenna elements, constructive and destructive superposition of the transmitted signals may be achieved for different angular directions with respect to these antennas. The more antennas are used, the higher the overall beamforming gain and the narrower a beam that may be formed. In exemplary embodiments a transmit/receive antenna or a transmit/receive antenna element may use an individual beam pattern. For example, a transportation vehicle may operate multiple antenna arrays, e.g., one in the front and one in the rear/back of the transportation vehicle. The individual antenna elements used in an array may already have a directional beam pattern. Typical half-power beam widths for such elements may be 150°, 120°, 90°, 60°, etc. The individual elements may point away from the transportation vehicle, i.e., a front element may point to the front and a rear element may point to the back.

For example, the control module 24 may control a beam switching matrix from which several predefined beams may be selected. A Butler-matrix or other hardware implemented solutions may be used to form the beams. Such a hardware-beamformer may allow the control module 24 selecting one out of a plurality of predefined beams. For example, 32, 64, 128, 256, 512, or 1024 may be predefined to select from.

As the pathloss at higher frequencies is also high a communication without enhanced antenna gain might not be possible, particularly, with moving transmitter and moving receiver. It is a finding that lower-frequency inter vehicular communication may be used in some exemplary embodiments to exchange information about antenna locations at the transmitter and receiver. Directional antennas can then be configured based on the information and a communication link can be maintained at the higher-frequency.

For example, the adjusting 16 of the beam pattern comprises adjusting a direction of a main lobe of the beam pattern. The relative position of the antennas of the transportation vehicles 100, 200 to each other changes, e.g., when one of the transportation vehicles moves along a curve. The direction of the beam pattern may then be adjusted accordingly. The adjusting 16 of the beam pattern may further comprise adjusting a maximum gain and/or a width of a main lobe of the beam pattern. For example, if an unstable radio channel is expected, e.g., due to a rough road surfaces, the beam pattern may be made wider so it can tolerate higher angular mismatches than a very narrow beam. The widening may cost/decrease antenna gain, which may be compensated by using a higher transmission power, more advanced signal processing or by accepting lower quality (e.g., higher bit error rate). Moreover, the adjusting 16 of the beam patterns may comprise adjusting a shape of the beam pattern. For example, if traffic gets more dense, and more interfering transportation vehicles are present, the beam pattern may be used for spatial interference cancellation. The shape of the beam pattern may be adjusted so to better suppress interferers, e.g., by directing spatial nulls in the directions of the interferers.

As has been mentioned before the determining 14 may be further based on information received within the mobile communication system 400. The mobile communication system 400 may be able to collect overview information, e.g., an environmental model from a network perspective, which may aid in the prediction of relative positions of transportation vehicles and interference situation in the network. In some exemplary embodiments, the method 10 may further comprise transmitting information related to a future position of the first transportation vehicle 100 or the antenna of the first transportation vehicle 100 to the second transportation vehicle 200 or within mobile communication system 400.

In a further exemplary embodiment the transportation vehicles 100, 200 may establish a control loop. The method 10 of the first transportation vehicle 100 may then further comprise exchanging control information to control mutual antenna configurations with the second transportation vehicle 200. For example, the control information may be exchanged on a lower frequency, which is used to determine and control directions of beam patterns. Such control information may aim at optimizing a certain signal quality (e.g., reception power, signal-to-noise ratio, signal-to-interference-and-noise-ratio, etc.) at the antennas of the transportation vehicles 100, 200. Some exemplary embodiments may configure the first antenna of the first transportation vehicle 100 to evoke a high signal quality at the location of the antenna of the second transportation vehicle 200 based on the two antenna locations and positions.

Figure 3:
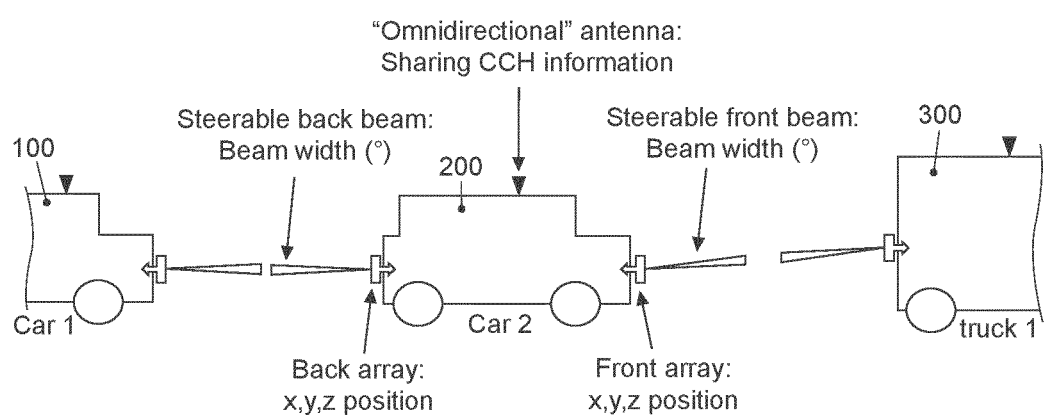
FIG. 3 illustrates an inter-vehicle communication scenario.

FIG. 3 illustrates an inter-vehicle communication scenario in an exemplary embodiment. FIG. 3 shows a transportation vehicle 200 (e.g., a car) in the center driving from the left to the right. There is another transportation vehicle 300 in front (e.g., a truck), and yet another transportation vehicle 100 (another car) behind. The transportation vehicles are assumed to operate directional antennas at a high radio frequency. Such directional antennas may be implemented by antenna arrays, e.g., defined geometrical arrangements of a plurality of antenna elements.

Transportation vehicle 200 has multiple antennas, there is one beamforming antenna in the front and another beamforming antenna in the back, the same assumption holds for the other transportation vehicles 100, 300. On the roof top of transportation vehicle 200 there is another omnidirectional antenna. In the exemplary embodiment depicted in FIG. 3 the object of transportation vehicle 200 is to form a beam in front (steerable front beam, with a certain width), which points towards another beamforming antenna in the back of transportation vehicle 300 to establish a communication link with transportation vehicle 300. Likewise, it is an object of transportation vehicle 200 to form a beam in the back (steerable back beam, with a certain width), which points towards the front antenna of transportation vehicle 100.

Moreover, in the present exemplary embodiment it is assumed that a first radio frequency is lower than a second radio frequency, for example, the first radio frequency is in an LTE band at around 2.1 GHz (sidelink, PC5 communication) and the second radio frequency is in a 5G 30 GHz band. In this exemplary embodiment different radio access technologies are used, LTE and 5G. In other exemplary embodiments the same access technology may be used at different frequencies, e.g., in a scenario using carrier aggregation.

In the exemplary embodiment shown in FIG. 3 it is assumed that the communication links on the second frequency are configured to transmit and receive data packets. Transportation vehicles 100, 200, 300 may transmit and receive data packets using the second radio frequency. For this communication, transportation vehicles 100, 200, 300 use the beamforming antennas. The beamforming antennas are accordingly adjusted as the transportation vehicles move along.

The transportation vehicles 100, 200, 300 know their future road (road profile, map data). They can predict an impact of future street conditions for the two mutual beams steering towards each other. Depending on the predicted street conditions the beam width and/or antenna weights (e.g., pointing beams to each other when driving a curve) of the antenna arrays may be changed. E.g., two transportation vehicles 100, 200 are communicating with each other via mmWave band through their two antenna arrays focusing towards each other. They know that in the next 10 sec. the street will be curvy and/or ground waves. Therefore, they decide to increase the beam width from 15° towards 20°; hence their communication link becomes more robust for the price of decreased antenna gain/directivity.

For example, the transportation vehicles may additionally exchange information on their locations using the first or second frequency thereby enabling the determination of relative angle between their antennas. For example, a message is received at the first transportation vehicle 100 from the second transportation vehicle 200. The message comprises information related to the antenna of the second transportation vehicle 200, e.g., information related to a location of the antenna, information related to a location of the second transportation vehicle 200 and information related to a location or position of the antenna on the second transportation vehicle 200, respectively. In some exemplary embodiments, transportation vehicles 100, 200, 300 are equipped with high precession localization GPS (Global Positioning System). Therefore, the x, y, z positions of the back array of transportation vehicle 200 may be received by transportation vehicle 100 via the omnidirectional CCH antenna and the front array position of transportation vehicle 100 can be received by transportation vehicle 200.

Transportation vehicle 100 further uses its own GPS receiver to determine information related to its own location. The configuring of the front beamforming antenna of transportation vehicle 100 can then be further based on the information related to its own location. For example, transportation vehicle 100 determines information related to a location of its front beamforming antenna based on the information related to its location. The adjusting 16 may then be based on the location of the beamforming front antenna on the first transportation vehicle 100 relative to the back or rear beamforming antenna of the second transportation vehicle 200. The adjusting 16 may comprise directing a main lobe of the directional antenna toward the antenna of the second transportation vehicle 200. In some exemplary embodiments this may be done by setting beamforming weights for the beamforming antenna so to form a beam pointing to the corresponding antenna as indicated in FIG. 3.

To set up both beamforming antennas on both sides transportation vehicle 100 may transmit an according message to the second transportation vehicle 200 using the first or second radio frequency. This message comprises information related to the antenna of the first transportation vehicle 100. For example, information related to the location of the antenna of the first transportation vehicle 100 is provided to enable the second transportation vehicle 200 to point its antenna beam towards the antenna of the first transportation vehicle 100.

Moreover, in exemplary embodiments, transportation vehicles may compensate their driving behavior. The information related to relative movement may also comprise movement evoked by driving maneuvers or behavior. The driving behavior may need to be compensated as breaking is introducing a mechanical theta offset as will be further explained using FIG. 4.

Figure 4:
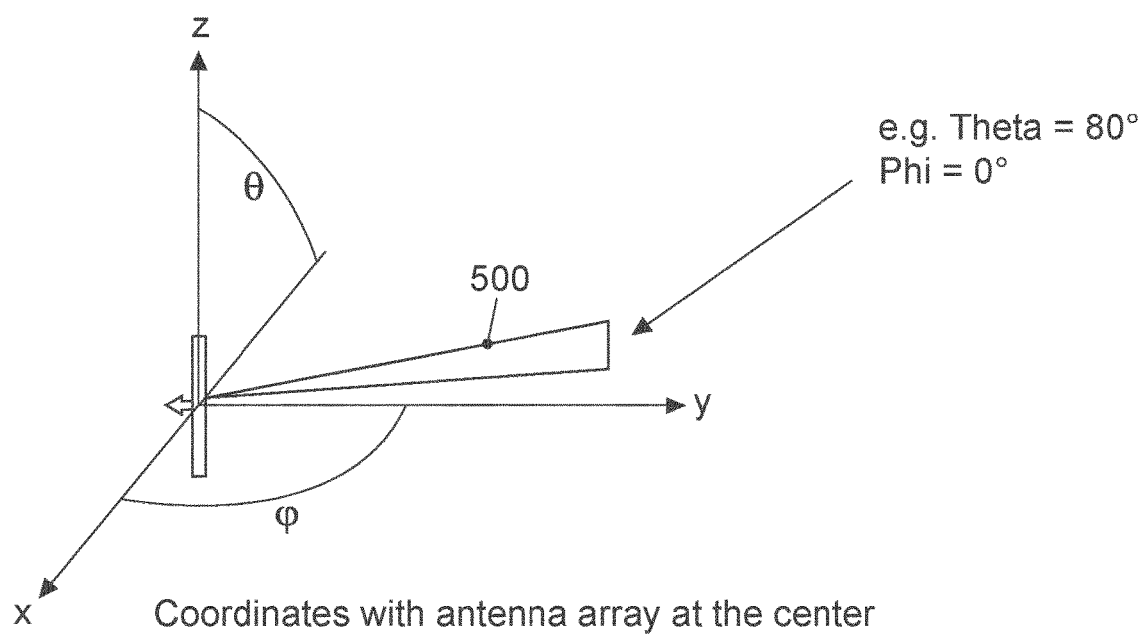
FIG. 4 shows determination of pencil beam angles in an exemplary embodiment.

FIG. 4 shows determination of pencil beam angles in an exemplary embodiment. In FIG. 4 it is assumed that a narrow beam with high antenna gain is formed. FIG. 4 shows a cartesian coordinate system based on coordinate directions x, y, and z. A beam 500 is exemplified, which can be defined by its elevation angle theta and its azimuth angle phi. For example, if two coordinates of a transmitting and a receiving antenna are known the angles theta and phi can be determined by the spatial vector difference between these positions/locations.

Disclosed embodiments may enable theta control. The beam is assumed to be generated in the back of transportation vehicle 100. If transportation vehicle 100 accelerates, theta is decreased (theta −), the beam is offset upwards. If the transportation vehicle decelerates, theta is increased (theta +), the beam is offset downwards. If the transportation vehicle 100 breaks, theta is increased stronger (strong theta offset ++). Hence, Acceleration (theta −); beam offset upwards; Deceleration (theta +); beam offset downwards; and Breaking (strong theta offset ++).

Phi may be controlled as well. A curvy street may lead to offsets of phi, which are controlled/compensated in exemplary embodiments as well.

Disclosed embodiments may provide a concept that allows a front beam (of following transportation vehicle) and a back beam (transportation vehicle driving ahead) and vice versa of two transportation vehicles to be maintained. This may be achieved by determining information related to relative movement of the antennas with respect to each other.

A transportation vehicle may be enabled to determine the position of an antenna of another transportation vehicle and then steer its own beam towards that direction. The transportation vehicles may use a more omnidirectional CAM message at lower frequencies to find the position of the antenna array of the respective communication partner and vice versa. For example, the lower frequencies may be used to establish a control channel for the beamforming at the second higher frequency.

As already mentioned, in exemplary embodiments the respective methods may be implemented as computer programs or codes, which can be executed on a respective hardware. Hence, another exemplary embodiment is a computer program having a program code for performing at least one of the above methods, when the computer program is executed on a computer, a processor, or a programmable hardware component. A further exemplary embodiment is a (non-transitory) computer readable storage medium storing instructions which, when executed by a computer, processor, or programmable hardware component, cause the computer to implement one of the methods described herein.

A person of skill in the art would readily recognize that operations of various above-described methods can be performed by programmed computers, for example, positions of slots may be determined or calculated. Herein, some exemplary embodiments are also intended to cover program storage devices, e.g., digital data storage media, which are machine or computer readable and encode machine-executable or computer-executable programs of instructions where the instructions perform some or all of the operations of methods described herein. The program storage devices may be, e.g., digital memories, magnetic storage media such as magnetic disks and magnetic tapes, hard drives, or optically readable digital data storage media. The exemplary embodiments are also intended to cover computers programmed to perform the methods described herein or (field) programmable logic arrays ((F)PLAs) or (field) programmable gate arrays ((F)PGAs), programmed to perform the above-described methods.

The description and drawings merely illustrate the principles of the disclosed embodiments. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed to furthering the art, and are to be construed as being without limitation to such specifically recited examples and conditions. Moreover, all statements herein reciting principles and embodiments of the disclosure, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate exemplary embodiment. While each claim may stand on its own as a separate exemplary embodiment, it is to be noted that—although a dependent claim may refer in the claims to a specific combination with one or more other claims—other embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having performing each of the respective operations of these methods.

LIST OF REFERENCE SIGNS 10 method for transportation vehicle
12 setting up a radio link to the second transportation vehicle
14 determining information related to relative movement between an antenna of the first transportation vehicle and an antenna of the second transportation vehicle based on sensor data of the first transportation vehicle
16 adjusting a beam pattern of the antenna of the first transportation vehicle based on the information related to relative movement to control the radio link
20 apparatus for transportation vehicle
22 one or more interface
24 control module
100 transportation vehicle
200 transportation vehicle
300 transportation vehicle
400 mobile communication system
500 beam

The invention claimed is:

1. A method for a first transportation vehicle in a mobile communication system for controlling operation of a radio link to a second transportation vehicle, the method comprising:
   setting up a radio link to the second transportation vehicle;
   determining information related to relative movement between an antenna of the first transportation vehicle and an antenna of the second transportation vehicle based on sensor data of the first transportation vehicle; and
   adjusting a beam pattern of the antenna of the first transportation vehicle based on the determined information related to the relative movement between the antenna of the first transportation vehicle and the antenna of the second transportation vehicle to control operation of the radio link to the second transportation vehicle.

2. The method of claim 1, wherein the sensor data comprises one or more elements of the group comprising radar, light detection and ranging, optical, camera, ultrasonic, time of flight, and acceleration data.

3. The method of claim 1, wherein the determination of the information related to relative movement is further based on data received from the second transportation vehicle.

4. The method of claim 1, wherein the information related to relative movement relates to future movement.

5. The method of claim 1, wherein the determination of the information relative movement is further based on information related to a driving maneuver, road profile, a route, or map data of the first and/or second transportation vehicles.

6. The method of claim 1, wherein the adjustment of the beam pattern comprises adjusting a direction of a main lobe of the beam pattern.

7. The method of claim 1, wherein the adjustment of the beam pattern comprises adjusting a maximum gain and/or a width of a main lobe of the beam pattern.

8. The method of claim 1, wherein the radio link uses a radio frequency above 6 GHz.

9. The method of claim 1, wherein the adjustment of the beam pattern comprises adjusting a shape of the beam pattern.

10. The method of claim 1, wherein the determination of the information related to relative movement is further based on information received within the mobile communication system.

11. The method of claim 1, further comprising transmitting information related to future position of the first transportation vehicle or the antenna of the first transportation vehicle to the second transportation vehicle or within the mobile communication system.

12. The method of claim 1, further comprising exchanging control information to control mutual antenna configurations with the second transportation vehicle.

13. A non-transitory computer readable medium including computer program having a program code for performing the method of claim 1, when the computer program is executed on a computer, a processor, or a programmable hardware component.

14. An apparatus for a transportation vehicle in a mobile communication system, the apparatus comprising:
   one or more interfaces configured to communicate in the mobile communication system; and
   a control module to control the one or more interfaces, wherein the control module configured to control operation of a radio link to a second transportation vehicle by setting up the radio link to the second transportation vehicle, determining information related to relative movement between an antenna of the first transportation vehicle and an antenna of the second transportation vehicle based on sensor data of the first transportation vehicle, and adjusting a beam pattern of the antenna of the first transportation vehicle based on the determined information related to the relative movement between the antenna of the first transportation vehicle and the antenna of the second transportation vehicle to control operation of the radio link to the second transportation vehicle.

15. A transportation vehicle comprising the apparatus of claim 14.

16. The apparatus of claim 14, wherein the sensor data comprises one or more elements of the group comprising radar, light detection and ranging, optical, camera, ultrasonic, time of flight, and acceleration data.

17. The apparatus of claim 14, wherein the determination of the information related to relative movement is further based on data received from the second transportation vehicle.

18. The apparatus of claim 14, wherein the determined information related to relative movement relates to future movement.

19. The apparatus of claim 14, wherein the determination of the information related to relative movement is further based on information related to a driving maneuver, road profile, a route, or map data of the first and/or second transportation vehicles.

20. The apparatus of claim 14, wherein the adjustment of the beam pattern comprises adjusting a direction of a main lobe of the beam pattern.

21. The apparatus of claim 14, wherein the adjustment of the beam pattern comprises adjusting a maximum gain and/or a width of a main lobe of the beam pattern.

22. The apparatus of claim 14, wherein the radio link uses a radio frequency above 6 GHz.

23. The apparatus of claim 14, wherein the adjustment of the beam pattern comprises adjusting a shape of the beam pattern.

24. The apparatus of claim 14, wherein the determination of the information related to relative movement is further based on information received within the mobile communication system.

25. The apparatus of claim 14, further comprising transmitting information related to future position of the first transportation vehicle or the antenna of the first transportation vehicle to the second transportation vehicle or within the mobile communication system.

26. The apparatus of claim 14, further comprising exchanging control information to control mutual antenna configurations with the second transportation vehicle.

* * * * *